(12) United States Patent
Wright

(10) Patent No.: US 11,389,027 B2
(45) Date of Patent: Jul. 19, 2022

(54) CONVEYOR BELT AND ENDLESS FRYER SYSTEM

(71) Applicant: Wilde Brands, Boulder, CO (US)

(72) Inventor: Jason Wright, Boulder, CO (US)

(73) Assignee: Wilde Brands, Boulder, CO (US)

( * ) Notice: Subject to any disclaimer, the term of this patent is extended or adjusted under 35 U.S.C. 154(b) by 285 days.

(21) Appl. No.: 16/427,950

(22) Filed: May 31, 2019

(65) Prior Publication Data

US 2019/0365153 A1 Dec. 5, 2019

Related U.S. Application Data

(60) Provisional application No. 62/678,752, filed on May 31, 2018.

(51) Int. Cl.
| | |
|---|---|
| *A47J 37/12* | (2006.01) |
| *B65G 49/02* | (2006.01) |
| *B65G 17/08* | (2006.01) |
| *A21B 5/08* | (2006.01) |

(52) U.S. Cl.
CPC .......... *A47J 37/1214* (2013.01); *B65G 49/02* (2013.01); *A21B 5/08* (2013.01); *A47J 37/1295* (2013.01); *B65G 17/083* (2013.01)

(58) Field of Classification Search
CPC .... B65G 15/54; B65G 17/061; B65G 17/062; B65G 17/063; B65G 17/064; B65G 17/083; A47J 37/1214; A47J 37/1295; A21B 5/08; A21B 5/48; A23L 5/11
See application file for complete search history.

(56) References Cited

U.S. PATENT DOCUMENTS

| | | | | |
|---|---|---|---|---|
| 1,686,596 | A | * | 10/1928 | Betz .......................... A21B 5/00 426/499 |
| 1,841,339 | A | * | 1/1932 | Schroder ................. B65G 15/54 198/698 |
| 3,152,537 | A | | 10/1964 | Dietz |
| 3,391,634 | A | | 7/1968 | Williams et al. |
| 4,059,046 | A | | 11/1977 | Yamazaki et al. |
| 4,542,821 | A | | 9/1985 | Livermore |
| 5,392,698 | A | * | 2/1995 | Sprecher ................. H05B 6/782 198/699.1 |
| 6,305,274 | B1 | | 10/2001 | Nothum, Sr. et al. |

(Continued)

FOREIGN PATENT DOCUMENTS

GB 2327331 A * 1/1999 .................. A23L 5/11

OTHER PUBLICATIONS

International Search Report from corresponding PCT application No. PCT/US19/34866, dated Aug. 16, 2019.

(Continued)

*Primary Examiner* — William R Harp
(74) *Attorney, Agent, or Firm* — Greer, Burns & Crain, Ltd.

(57) ABSTRACT

A flying system for flying a food product is disclosed having an endless conveyor system for cooking product in a bath of hot cooking oil. An upper conveyor belt of the conveyor system includes a plurality of protrusions on the surface that retains the food items with a lower conveyor belt. The protrusions may be formed by bars or rods that may be integrally formed with a fluid pervious surface forming the belt. Also, a process of cooking food items with an endless conveyor system.

21 Claims, 9 Drawing Sheets

(56) References Cited

U.S. PATENT DOCUMENTS

| | | | |
|---|---|---|---|
| 8,124,154 B2 * | 2/2012 | Basker | A21B 5/08 |
| | | | 426/438 |
| 8,464,635 B1 | 6/2013 | Sprinkle et al. | |
| 9,814,244 B1 * | 11/2017 | McFarland | A21B 1/42 |
| 2011/0108476 A1 | 5/2011 | MacLachlan | |

OTHER PUBLICATIONS

Written Opinion from corresponding PCT Application No. PCT/US2019/34866, dated Jul. 23, 2019.

* cited by examiner

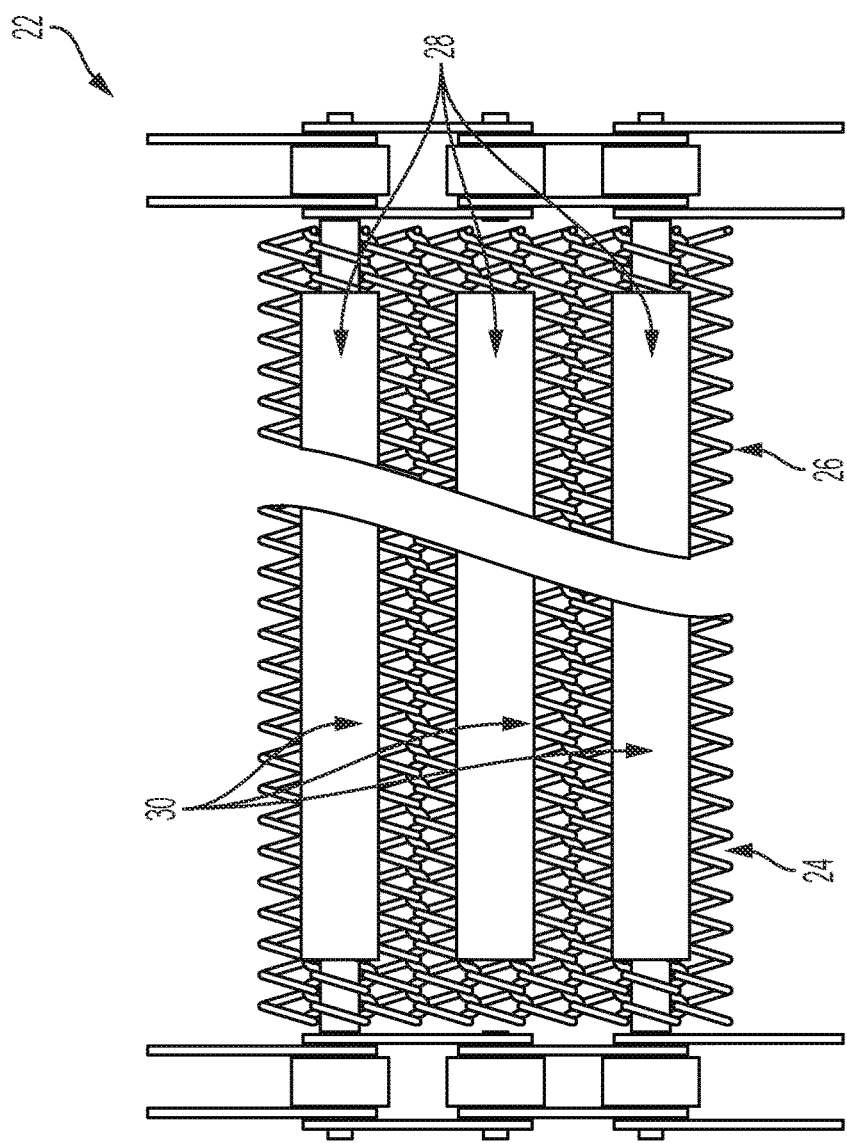
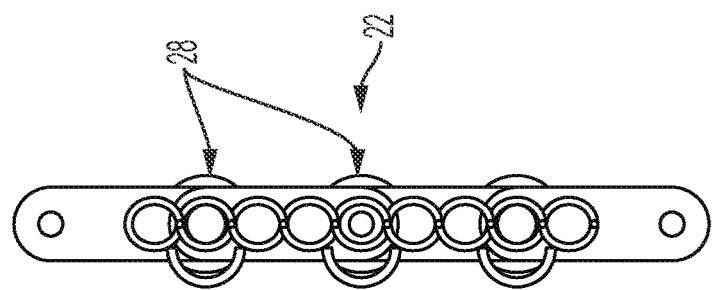
FIGURE 4B
FIGURE 4A

CONVEYOR BELT AND ENDLESS FRYER SYSTEM

RELATED APPLICATIONS

This application claims priority to U.S. Provisional Patent Application Ser. No. 62/678,752, filed on May 31, 2018 the entirety of which is incorporated herein by reference.

FIELD OF THE INVENTION

The present application generally relates to hot fluid fryers for the continuous frying of food products, particularly for large scale food process lines.

BACKGROUND OF THE INVENTION

Endless frying systems include a reservoir or tank for holding a bath of hot cooking fluid (i.e., oil) for cooking various food items, such as chips, tortillas, pizza crust, crackers, or the like. A conveyor system is used to continuously transport the uncooked food items at one end into the bath and recover the cooked food items from the bath at the second end. The conveyor system includes at least two conveyor belts that each form a continuous loop. A first conveyor is located above the food items as the food items pass through the bath from one end to the other end. A second conveyor is located below the food items as the food items pass through the bath from one end to the other end. Such frying systems are generally known in the art. See, U.S. Pat. Nos. 6,305,274 and 8,464,635 (both of which are incorporated herein by reference in their entirety).

While presumably effective for their intended purposes, it is believed that current endless frying systems do not efficiently and effectively allow for the cooked food items to have a contoured surface that differs for each of the cooked food items. In other words, while the frying systems provide cook food items, all the cooked food items have the same general appearance and lack an individualized appearance that often occurs with food items that are prepared individually.

Therefore, there is a need for an endless frying system which provides cooked food items with a contoured surface that varies among the food items being cooked.

SUMMARY OF THE INVENTION

The present invention provides, in one or more embodiments, a new conveyor belt, which is preferably used in an endless frying system. Accordingly, in one or more embodiments, the present invention also provides an endless frying system which provides the cooked food items with a contoured surface. Additionally, in one or more embodiments, the present invention provides processes for cooking a food item with an endless frying system to obtain a cooked food item with a contoured surface.

Therefore, in one or more aspects, the present invention may be characterized as providing a new conveyor belt which includes a fluid porous structure and a plurality of protrusions extending away from the fluid porous structure. The conveyor belt forms a loop. It is contemplated that the protrusions are formed by a plurality of bars. The bars may be cylindrical and may be welded to the fluid porous structure. Additionally, the bars may be parallel to each other. The bars may extend across a width of the conveyor belt. The conveyor belt may be used in an endless frying system.

The present invention, according to various aspects, may also be characterized as providing an endless frying system which includes: a reservoir for holding a bath of cooking fluid; and, a conveyor system configured to move food items through the bath in a direction of travel while the food items are cooked in the cooking fluid. The conveyor system may include a first conveyor belt, the first conveyor belt forming a loop; and, a second conveyor belt positioned to retain the food items on the second conveyor belt as the food items are moved through the bath. The second conveyor belt may include a fluid porous structure and a plurality of protrusions extending away from the fluid porous structure towards the first conveyor belt. The second conveyor belt may form a loop. The protrusions may be formed by a plurality of bars. The bars may be cylindrical and may be welded to the fluid porous structure. The bars may be parallel to each other. The bars may extend across a width of the upper conveyor belt. According to one or more embodiments, the first conveyor belt is a lower conveyor belt and wherein the second conveyor belt is an upper conveyor belt.

Furthermore, the present invention, according to various aspects, may also be characterized as providing a process for cooking a food item in an endless frying system by: continuously providing a supply of food items to a lower conveyor belt, the lower conveyor belt forming a loop; retaining the food items on the lower conveyor belt with an upper conveyor belt, the upper conveyor belt comprising a fluid permeable structure and a plurality of protrusions extending away from the chain-link structure towards the lower conveyor belt, the upper conveyor belt forming a loop; submerging the food items in a bath of cooking fluid while moving the food items through the bath; cooking the food items in the bath; and, recovering cooked food items, wherein the cooked food items include a contoured surface.

The present invention, according to various aspects, may be further characterized as providing a process of cooking a food item in an endless frying system by: continuously providing a plurality of uncooked food items at a first end of a first conveyor belt, wherein the uncooked food items are planar, when viewed from the side, preferably disk shaped (i.e., circular when viewed from above); moving the first conveyor belt with the uncooked food items through a bath of cooking fluid; retaining the uncooked food items on the first conveyor belt with a second conveyor belt while the first conveyor belt is being moved through the bath of cooking fluid, the second conveyor belt comprising a fluid porous structure and a plurality of protrusions extending away from the fluid porous structure towards the first conveyor belt to provide the second conveyor belt with a non-planar surface; and, recovering cooked food items at a second end of the of the first conveyor belt, wherein the cooked food items have a non-planar shape. The uncooked food items may have a disk shaped. The non-planar shape of the cooked food items may be selected from the group consisting of: contoured, convex, concave, or undulating.

According to one or more aspects, the present invention provides a process of cooking a food item in an endless frying system as described herein.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following photographs and drawings, in which:

FIGS. 4A and 4B are a side and top view, respectively, of a schematic drawing of the conveyor belt shown in FIG. 2;

DETAILED DESCRIPTION OF THE INVENTION

With these above general principles in mind, one or more embodiments of the present invention will be described with the understanding that the following description is not intended to be limiting.

Figure 1:
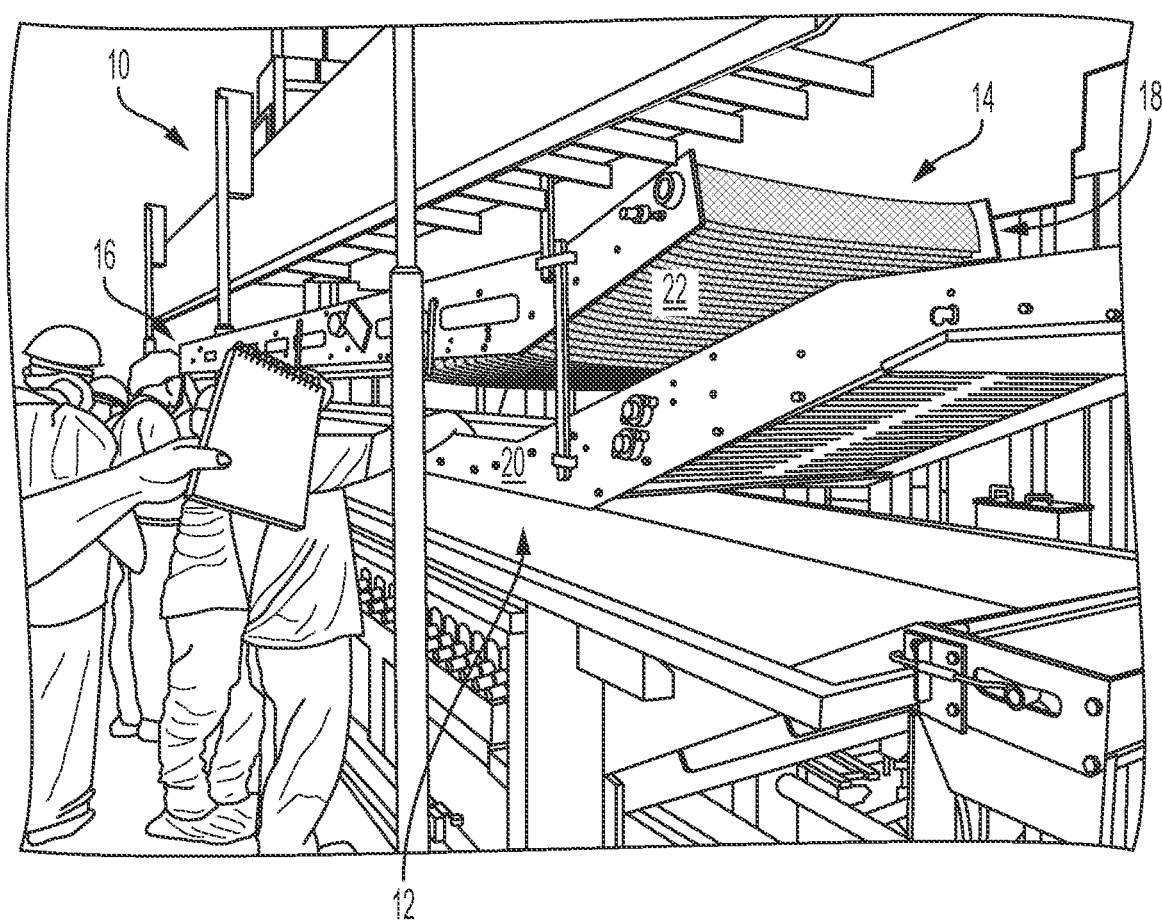
FIG. 1 shows a side and end view of an endless frying system according to one or more aspects of the present invention.
Figure 2:
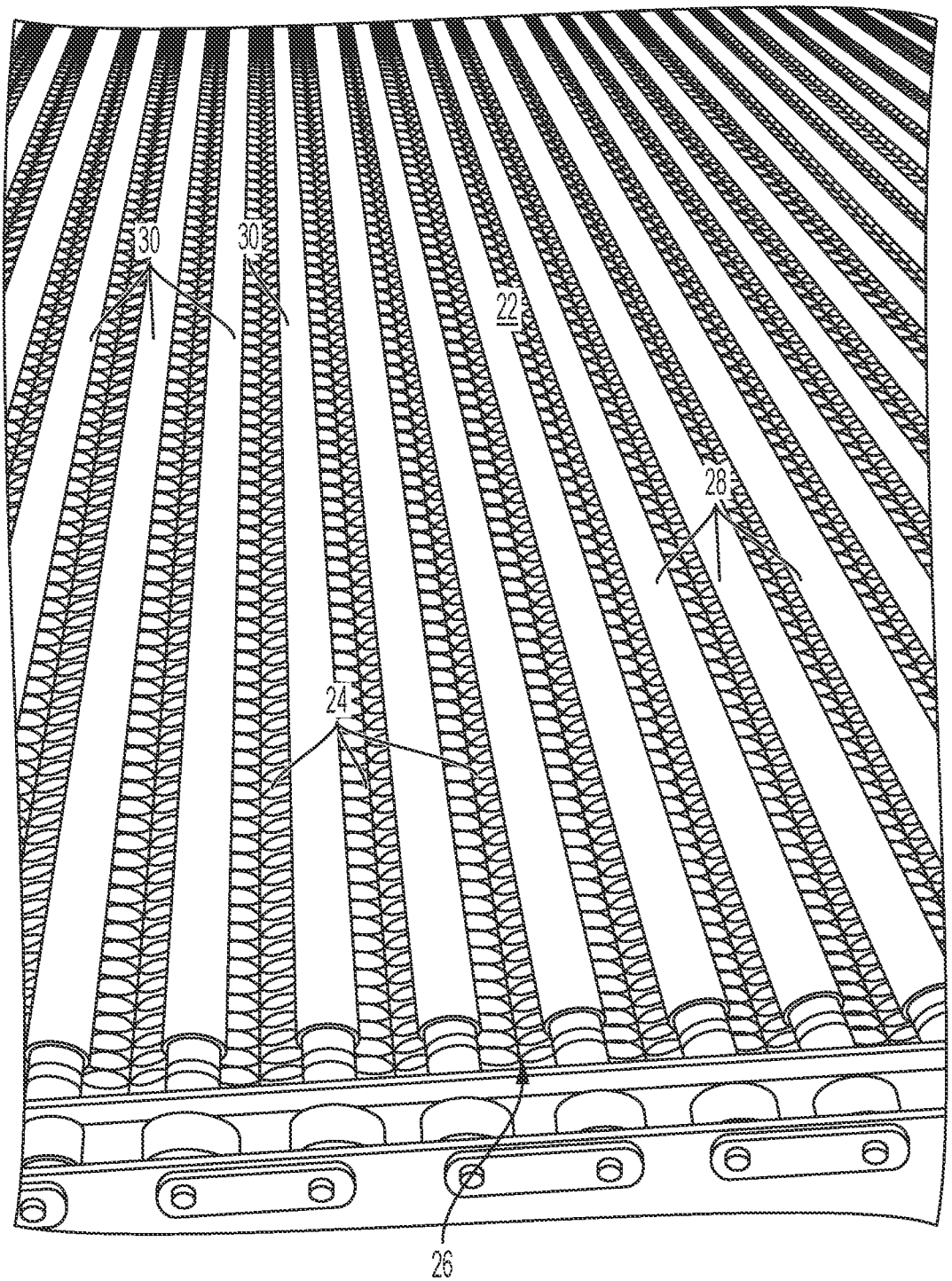
FIG. 2 shows a top and side view of an upper conveyor of the endless flying system of claim 1.
Figure 3:
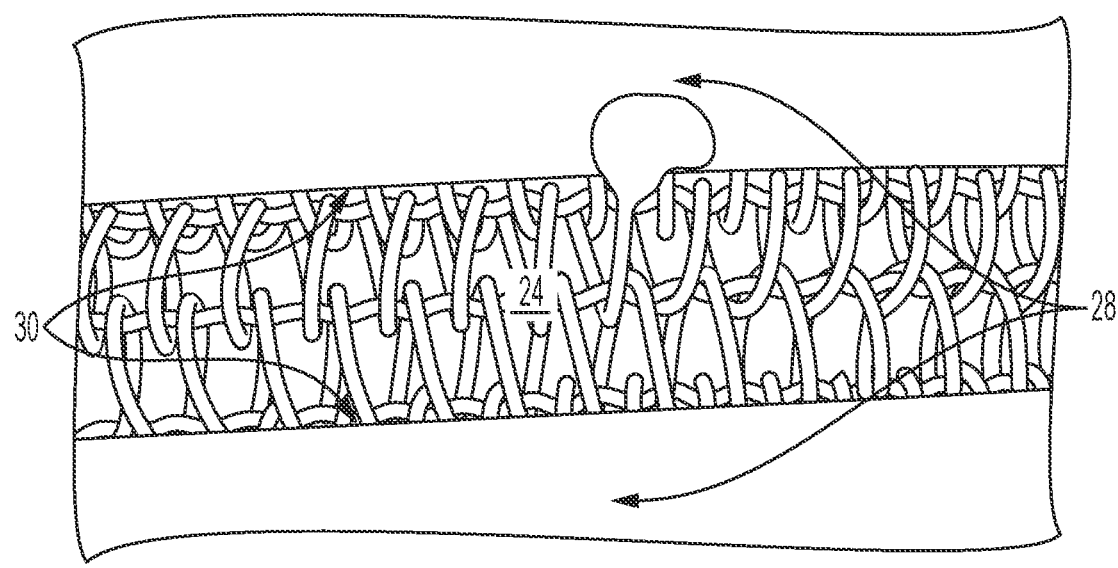
FIG. 3 is a close-up of the upper conveyor belt shown in FIG. 2.

As mentioned above, with reference to FIG. 1, the present invention relates to a conveyor belt which may be, but is not required to be provided, in association with an endless frying system 10. The endless frying system 10 comprises a reservoir (or a bath) 12 that contains a cooking fluid that is heated in a known manner A conveyor system 14 carries food items from a first end 16 of the endless frying system 10 to a second end 18 of the endless frying system 10. The conveyor system 14 includes a lower conveyor belt 20 and an upper conveyor belt 22, typically called a submerger belt. Both the lower and upper conveyor belts 20, 22 form separate loops to allow for food to continuously be transported through and cooked in the bath 12. The two belts 20, 22 are positioned one above the other, for at least an extended portion of their paths of travel, so that the two belts 20, 22 will have an extended length in which the two belts 20, 22 have parallel portions. At the parallel portions, the outer surfaces of each of the belts 20, 22 (i.e., the surfaces of the belts 20, 22 facing the other belt) hold the food items while passing through the bath 12. The distance between these belts 20, 22 is typically between ⅛ to ¼ of an inch; however other distances can be used depending on the food items being cooked.

Although not specifically depicted, as is known, at least one or both of the lower and upper conveyor belts 20, 22 are driven by a motor which may be controlled by a controller including a processor and a memory storing computer-readable instructions that, when executed by the at least one processor, cause the one or more computing devices to perform a process that may include one or more steps of the present invention.

Turning to FIGS. 2, 3, 4A, 4B, and 5, a conveyor belt according to various aspects of the present invention is depicted which, in a preferred exemplary, is the upper conveyor belt 22 in the endless frying system 10. This depiction of an exemplary is not intended to be limiting.

The depicted upper conveyor belt 22 includes a fluid permeable structure 24 of a durable material such as stainless steel or other metals, a ceramic, or a polymer-based material capable of withstanding exposure to hot oil or other cooking fluids. Furthermore, the material of the fluid permeable structure 24 must also have sufficient flexibility to allows it to bend as the belt 22 is moved continuously. An exemplary fluid permeable structure 24 is a chain link mesh. Other structures are contemplated to be used, so long as they are pervious to the cooking fluids, yet impervious to the food items, as discussed below.

Although the fluid permeable structure 24 is porous so that the cooking fluid flows through the pores as the belt 22 moves through the reservoir for the bath 12, the pores or apertures should be sized so that food items cannot fit through the pores. Thus, if the belts' 20, 22 purchase, or grip, of a food item does diminish and the food item is no longer held between the belts 20, 22, the food item is not likely to float up through the upper conveyor belt 22. Accordingly, it is believed that the maximum opening size for the pores of the fluid permeable structure 24 should be smaller than the food item to be cooked, and, therefore, in most cases approximately ½ an inch.

In an embodiment, located on an outer surface 26 (the surface that is adjacent the food items along a lower leg or run of the continuous upper conveyor belt 22) of the fluid permeable structure 24 is a plurality of protrusions 28 extending away from the outer surface 26. In at least one embodiment, the protrusions 28 are created with a plurality of parallel cylindrical rods 30, or portions of cylindrical rods, extending continuously across the width of the outer surface 26 in a direction perpendicular to the direction of movement of the belt 22 to provide the outer surface 26 with an undulating surface. The rods 30 are welded or otherwise attached to the fluid permeable structure 24. For example, instead of being welded, the rods 30 could be glued or held with fasteners like screws, clamps, bolts, clips, pins, etc. Alternatively, as discussed below, the rods 30 could be co-formed with the fluid permeable structure 24.

The depicted parallel cylindrical rods 30 are merely preferred, and the rods 30 need not be cylindrical, extend perpendicularly or across the width of the outer surface 26, or be parallel to each other. For example, instead of being cylindrical (and thus having a circular cross section), the rods 30 could have a cross section that is square, elliptical, rectangular, triangular, or some other polygon shape. Moreover, the rods 30 could be laid out in a herringbone or other crossing pattern. It is further contemplated that the rods 30 extend in a direction parallel to the direction of travel; however, due to the belt 22 forming a loop, the rods 30 should be made of a suitable material or have a configuration that allows the rods 30 to bend as the belt 22 is moved. It is also contemplated, that the rods 30 extend across less than the width (i.e., the dimension perpendicular to the direction of travel) of the belt 22. Additionally, each rod 30 may be formed form multiple discrete rods which, in additional to being spaced from other rods 30 in the direction of travel, are spaced from each other in a direction perpendicular to the direction of travel.

Furthermore, the use of the rods 30 to provide the protrusions 28 on the outer surface of the chain link structure 24 is merely preferred, and other structures or elements may be utilized to provide the protrusions 28, such as protrusions integrally formed in the fluid permeable structure 24, or structures inside of the belt that kink or otherwise bend the chain links of the fluid permeable structure 24 to create protrusions.

The particular structure that provides the protrusions 28 is not important for the practicing of the present invention;

rather, what is important is that the outer surface 26 of the upper conveyor belt 22 (or lower conveyor belt 20) contains protrusions 28 that are configured to provide a non-planar surface for the outer surface 26 of the upper conveyor belt 22 along its length and width, contoured in a manner to achieve a desired non-planar configuration for the cooked food item.

It is understood that most outer surfaces 26 of the fluid permeable structure 24 may include some small surface irregularities or may intentionally include some small bumps. These small surface bumps are not configured to provide a non-planar surface for the outer surface 26 of the upper conveyor belt 22 along its length and width to achieve a desired non-planar configuration for the cooked food item. Rather they are too often too small to allow for the cooked items to become contoured during cooking.

While the exact size of the protrusions 28 depends on the type of food items and the desired look of the cooked food item, it is believed that protrusions 28 should have a height (distance from the outer surface 26 of the upper conveyor belt 22) of at least ⅛ an inch, or at least ¼ an inch, or at least ½ an inch. For example, the protrusions 28 could be formed with rods 30 having a ¼ inch diameter, or a ½ inch diameter, or an inch diameter. Other sizes may be utilized depending on the size of the food items. Additionally, the spacing between the protrusions 28 (or rods 30) may depend on both the size of the food items and the size of the protrusions 28. For example, the protrusions 28 (or rods 30) may be spaced apart a ¼ inch, or a ½ inch, or an inch. In order to provide the desired texture, it is believed that the food items should (on average) contact at least two, and preferably three, protrusions 28 (or rods 30). In an exemplary embodiment, for a food item with a diameter size of approximately 2.25 inches, rods 30 with a ¼ inch diameter may be spaced a ¼ inch apart. In another exemplary embodiment, for a food item with a diameter size of approximately 2.25 inches, rods 30 with a ½ inch diameter may be spaced a ½ inch apart. It is believed that for a food item with a 3 inch diameter, rods 30 with a one inch diameter may be spaced apart an inch or a ½ inch.

Moreover, although the protrusions 28 are depicted as having the same height, it is contemplated that the outer surface 26 of the upper conveyor belt 22 have protrusions 28 with varying sizes.

Figure 7:
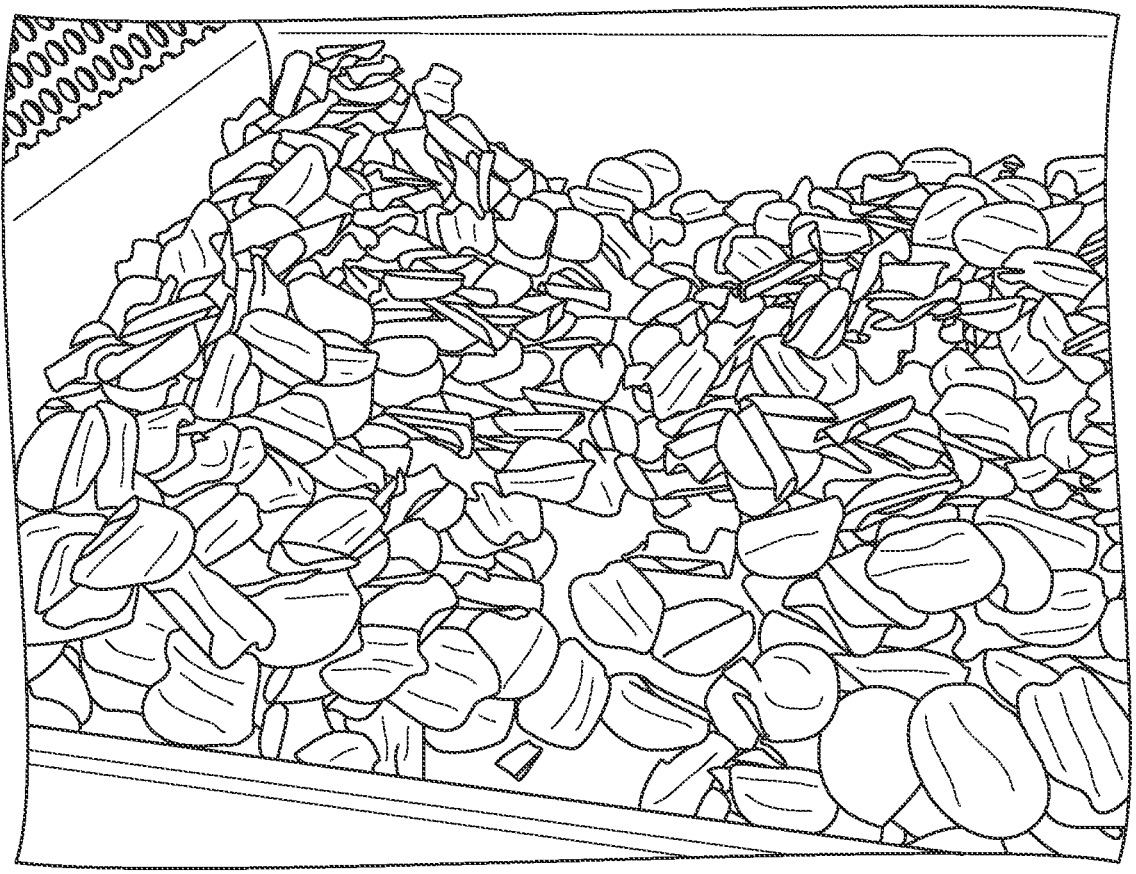
FIG. 7 is a top and side view of food items made in accordance with one or more aspects of the present invention.

As a result of the protrusions 28 providing the outer surface 26 of the upper conveyor belt 22 with a non-planar surface that retains the food items, the upper conveyor belt 22 according to the present invention will produce cooked food items that are contoured as opposed to being planar. See, FIG. 7. This is due, in part, to the space between the protrusions 28 which allows portions of the food items to curl upwards the towards the fluid permeable structure 24 between adjacent protrusions 28 when the food items are being cooked, while at the same time the food items are being retained in the conveyor system 14.

Figure 5:
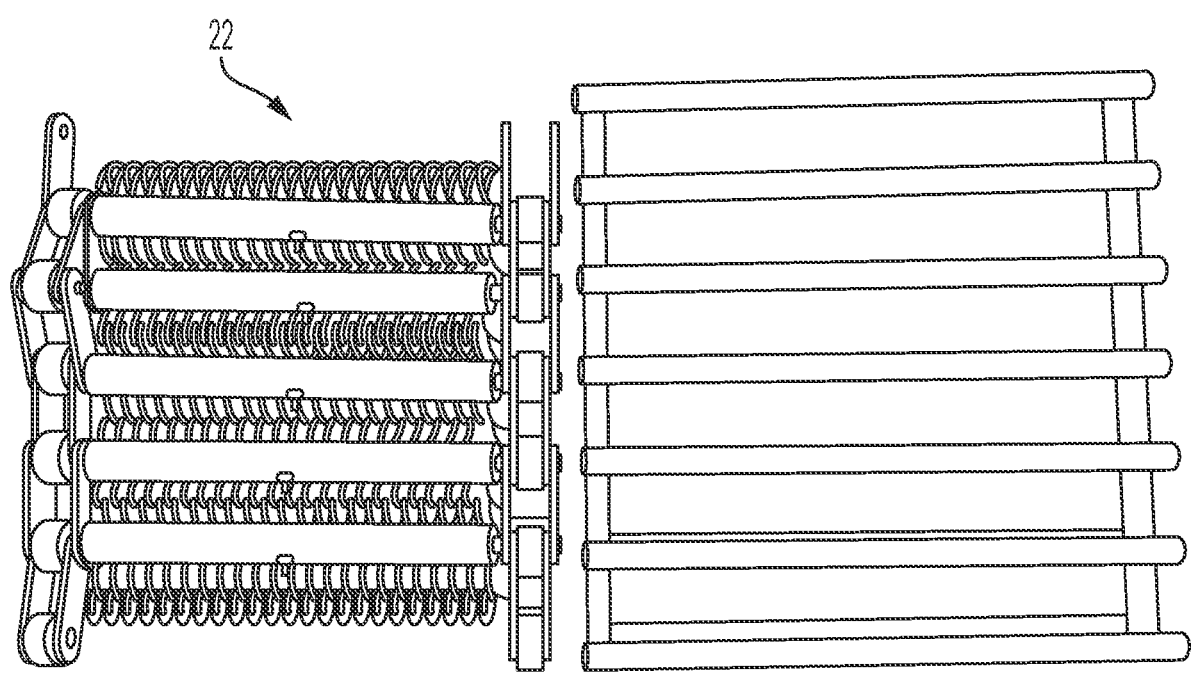
FIG. 5 is a side by side top view of a prior art conveyor belt, on the right, and the conveyor belt shown in FIG. 2, on the left.

Thus, a conventional upper conveyor belt, which only includes bars that are spaced apart (such as shown in FIG. 5), may provide some food items that are contoured; however, food items are likely to float out of the conveyor belts between the bars and remain in the bath due to the gaps between the bars. This is undesirable as it results in a loss of usable product, and it may require more frequent cleaning of the bath. Furthermore, some food items can easily adhere to each other if not securely held by the conveyor belts. Accordingly, while the food items may be contoured, the cooking of the food items is not efficient and effective and may not be a viable option for producing cooked food items.

As mentioned above, the present endless frying system 10, which includes a conveyor belt as discussed above does not suffer from these drawbacks.

Figure 6:
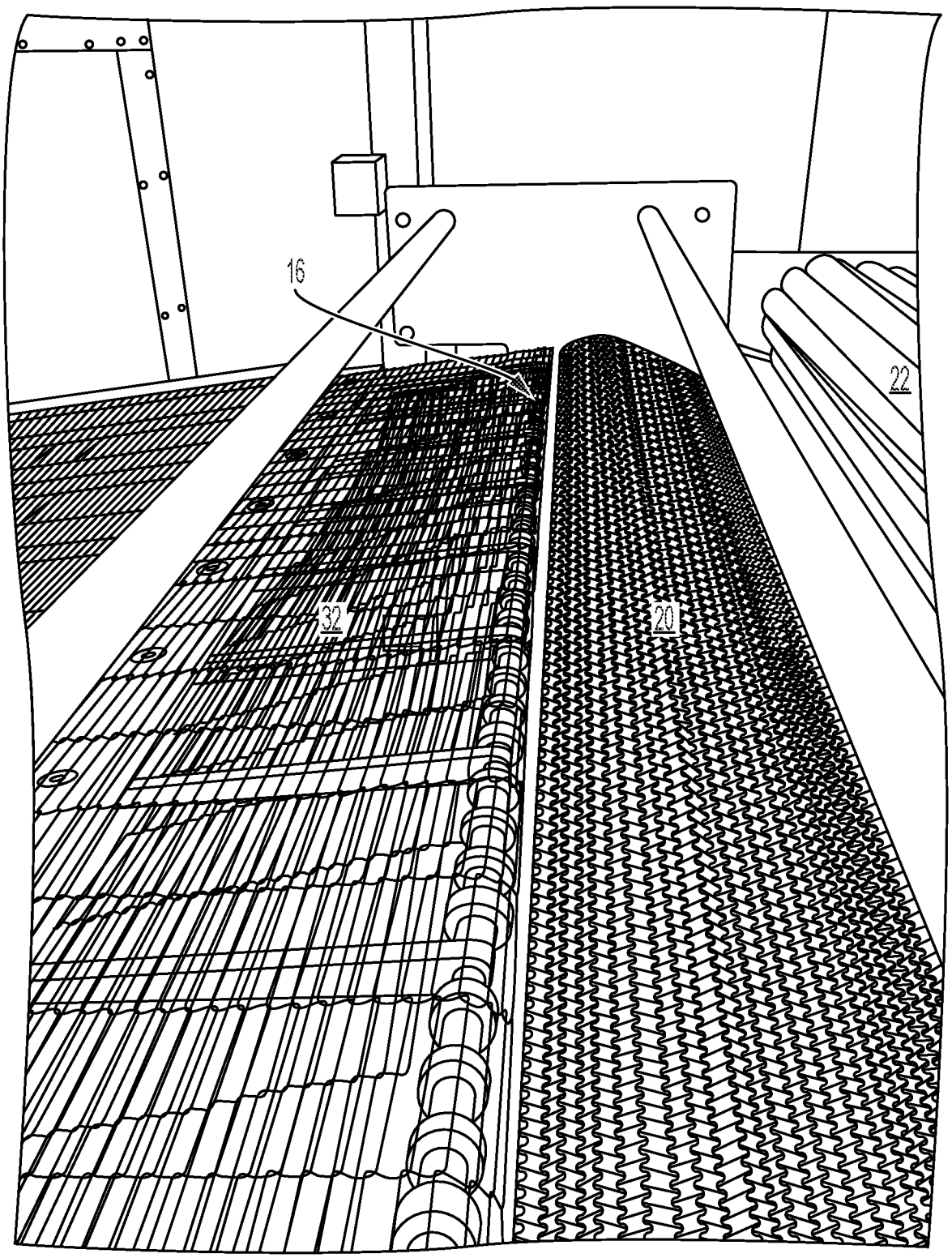
FIG. 6 is a side view of an end of the endless flying system shown in FIG. 1.

As shown in FIG. 6, the first end 16 of the endless frying system 10 includes a third conveyor belt 32 which provides the food items to the lower conveyor belt 20. The upper conveyor belt 22 is displaced so that there is a space between the front ends of the upper and lower conveyor belts 20, 22.

In another embodiment of the present invention, it is contemplated that the fluid porous structure 24 is integrally formed with the protrusions 28 by using only rods 30 that spaced apart a distance that is no greater than approximately the thickness of the food items. In such a configuration, the spacing between rods would allow the cooking fluid to flow between adjacent rods 30, but would limit the food items from flowing between adjacent rods 30.

Figure 8:
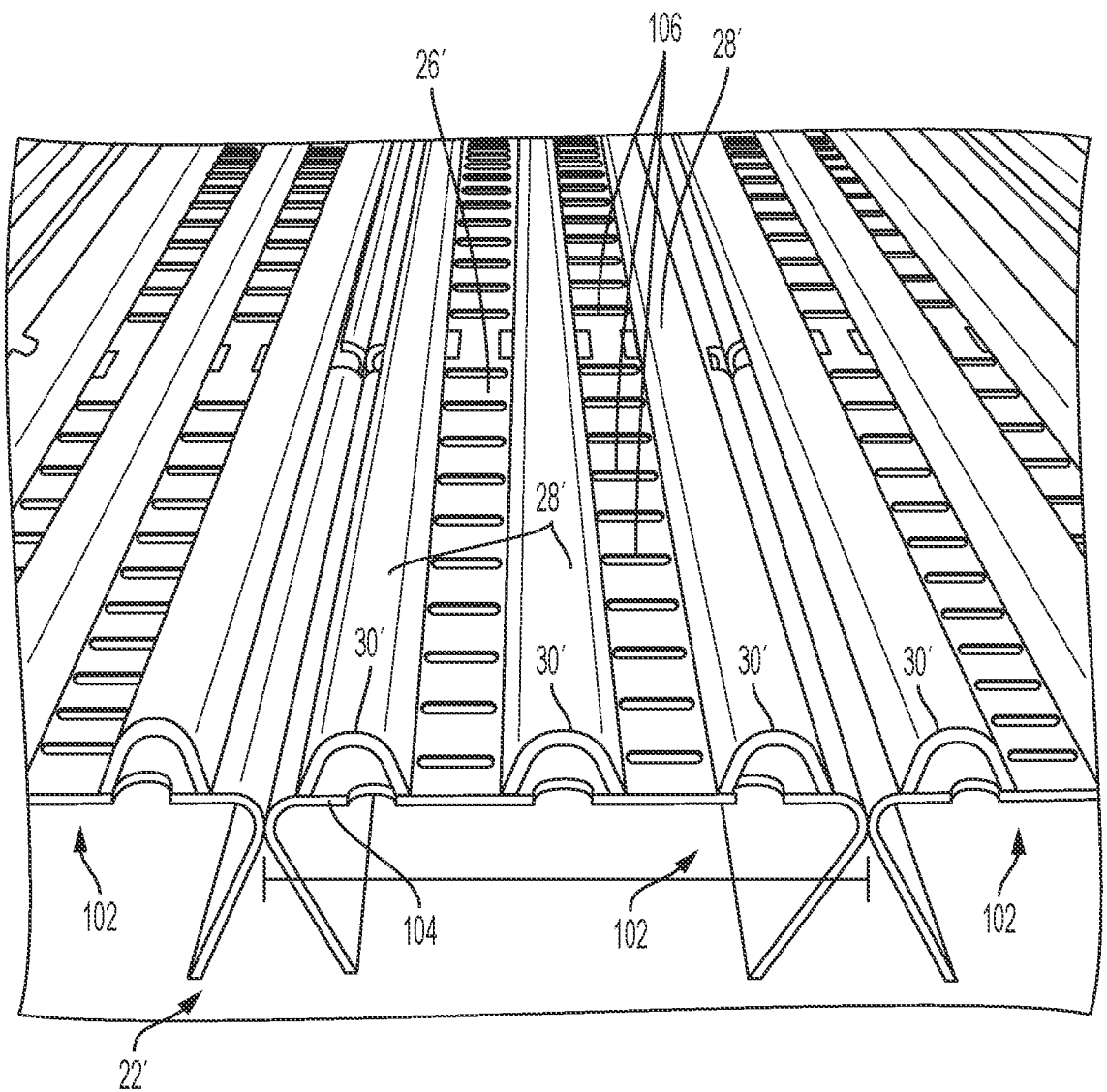
FIG. 8 is a top and side view of another conveyor belt according to the present invention; and, FIG. 9 is a side and top perspective view of a link used to form a conveyor belt according to the present invention.

Turning to FIG. 8, another conveyor belt 22' is shown, in which the belt 22' is formed by a plurality of links 102 that are connected in a manner that forms the belt 22'. Each link 102 includes a base portion 104 that includes a plurality of apertures or pores 106, allowing fluid to flow therethrough while the belt 22' moves food items through the bath of cooking oil.

Disposed on the outer surfaces 26' of the links 102 are the protrusions 28'. In the embodiment of FIG. 8, the protrusions 28' on the links 102 are formed by semi-cylindrical rods 30' attached to the base portions 104. These rods 30' may be arranged in a similar manner to ones described above, and thus, can have different shapes, positions, etc. In the depicted embodiment, the rods 30' comprise cylindrical tubes that have been cut in half so that the outer profile of the rods 30' (viewed from a side along the longitudinal axis of the rod 30') form a half-circle or a semi-circle.

Figure 9:
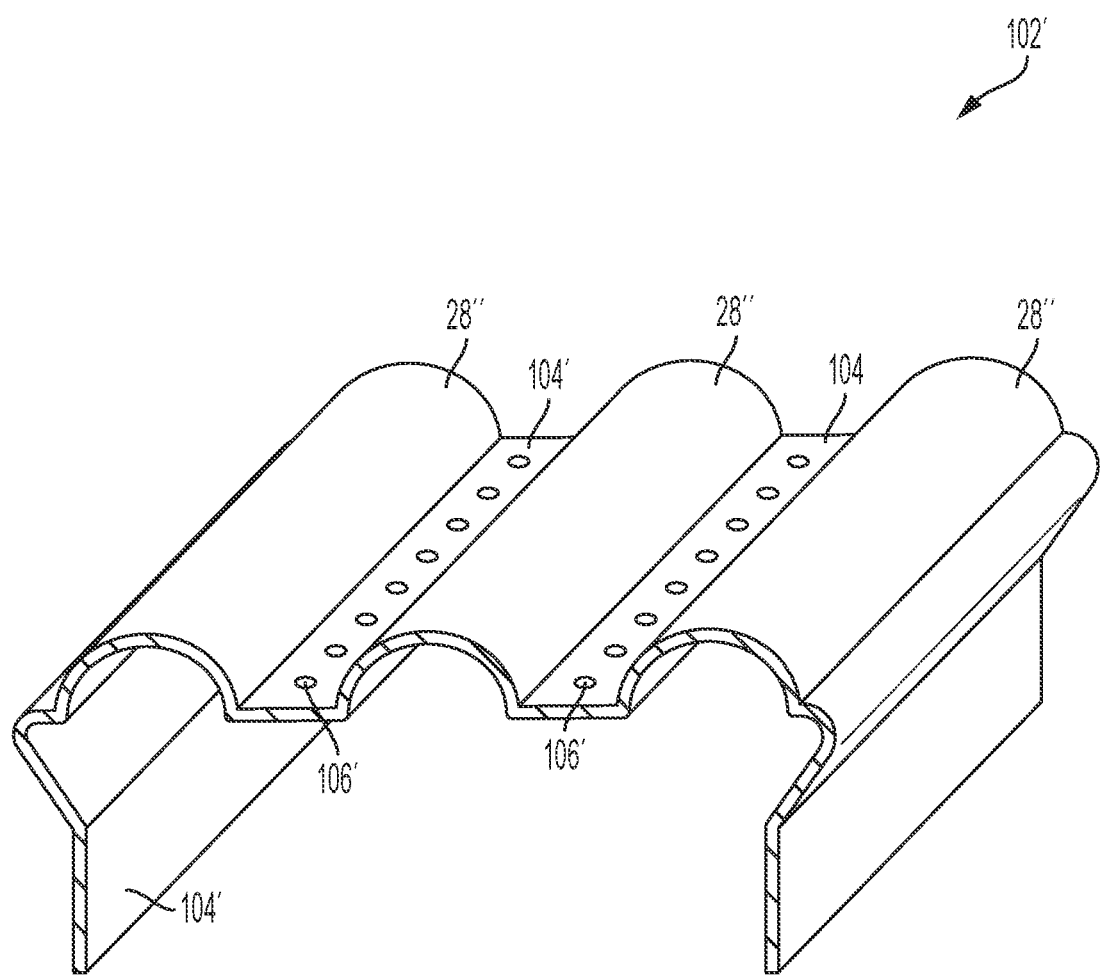

Turning to FIG. 9, another link 102' is shown in which protrusions 28" are formed integrally with the base portions 104'. For example, the link 102' could be formed by stamping a sheet, creating the three protrusions 28" that have a longitudinal axis extending perpendicularly to a direction of motion with the base portions 104' having apertures 106' located between adjacent protrusions 28". Again, the numbering, shape and spacing of these integral protrusions 28" can be varied as discussed above. It is believed that the integrally formed protrusions 28" are less likely to mechanically fail compared with some ways that discrete rods are secured to the links or the fluid impervious structure.

Accordingly, a process of cooking a food item according to the present invention may generally include the following steps:

continuously providing a supply of food items to a lower conveyor belt, the lower conveyor belt forming a loop;

retaining the food items on the lower conveyor belt with an upper conveyor belt, the upper conveyor belt comprising a fluid porous structure and a plurality of protrusions extending away from the fluid porous structure towards the lower conveyor belt to provide the upper conveyor belt with a non-planar surface, the upper conveyor belt forming a loop;

submerging the food items in a bath of cooking fluid while moving the food items through the bath;

cooking the food items in the bath; and, recovering cooked food items, wherein the cooked food items include a contoured surface.

Accordingly, another process of cooking a food item according to the present invention may generally include the following steps:

continuously providing a plurality of uncooked food items at a first end of a first conveyor belt, wherein the uncooked food items are planar (when viewed from the side), preferably disk shaped (i.e., circular when viewed from above), although other perimeter shapes are contemplated as well;

moving the first conveyor belt with the uncooked food items through a bath of cooking fluid;

retaining the uncooked food items on the first conveyor belt with a second conveyor belt while the first conveyor belt is being moved through the bath of cooking fluid, the second conveyor belt comprising a fluid porous structure and a plurality of protrusions extending away from the fluid porous structure towards the first conveyor belt to provide the second conveyor belt with a non-planar surface; and, recovering cooked food items at a second end of the of the first conveyor belt, wherein the cooked food items have a non-planar shape (when viewed from the side). The non-planar shape can be contoured, convex, concave, or undulating.

Other conventional features may be included in the endless frying system, for example, paddles or other structures at the end of the conveyor system configured to remove/dislodge any cooked food items that adhere to the upper conveyer belt or lower conveyor belt.

It should be appreciated and understood by those of ordinary skill in the art that various other conventional components such as valves, pumps, filters, coolers, heaters, exchangers, switches, sensors, controllers, microprocessors, computers, etc. were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. An endless frying system comprising:
    a reservoir for holding cooking fluid; and,
    a conveyor system configured to move food items through the bath in a direction of travel while the food items are cooked in the cooking fluid, the conveyor system comprising:
    a first conveyor belt, the first conveyor belt forming a loop; and,
    a second conveyor belt positioned to retain the food items on the second conveyor belt as the food items are moved through the bath, the second conveyor belt comprising a fluid porous structure and a plurality of protrusions extending away from the fluid porous structure towards the first conveyor belt, the second conveyor belt forming a loop, and wherein longitudinal axes of each protrusion from the plurality of protrusions extend perpendicular to the direction of travel,
    wherein the first conveyor belt comprises a lower conveyor belt, and
    wherein the second conveyor belt comprises an upper conveyor belt.

2. The endless frying system of claim 1, wherein the protrusions are formed by a plurality of bars.

3. The endless frying system of claim 2, wherein the bars are at least partially cylindrical and are welded to the fluid porous structure.

4. The endless frying system of claim 2, wherein the bars are parallel.

5. The endless flying system of claim 2, wherein the bars extend across a width of the upper conveyor belt.

6. The endless flying system of claim 1, wherein the protrusions are formed integrally with the fluid porous structure.

7. The endless flying system of claim 1, wherein the fluid porous structure comprises a plurality of links.

8. The endless flying system of claim 7, wherein each link includes a protrusion from the plurality of protrusions integrally formed in the link.

9. The endless flying system of claim 1, wherein adjacent protrusions from the plurality of protrusions are spaced from each other by a distance in the direction of travel such that the food items contact at least two protrusions.

10. A process of cooking a food item in an endless flying system, the process comprising:
    continuously providing a plurality of uncooked food items at a first end of a first conveyor belt, wherein the uncooked food items are planar, when viewed from a side;
    moving the first conveyor belt with the uncooked food items through a bath of cooking fluid in a direction of travel;
    retaining the uncooked food items relative to the first conveyor belt with a second conveyor belt while the first conveyor belt is being moved through the bath of cooking fluid, the second conveyor belt comprising a fluid porous structure and a plurality of protrusions extending away from the fluid porous structure towards the first conveyor belt to provide the second conveyor belt with a non-planar surface, wherein the first conveyor belt comprises a lower conveyor belt and wherein the second conveyor belt comprises an upper conveyor belt and wherein longitudinal axes of each protrusion from the plurality of protrusions extend perpendicular to the direction of travel; and,
    recovering cooked food items at a second end of the of the first conveyor belt, wherein the cooked food items have a non-planar shape.

11. The process of claim 10, wherein the protrusions are formed integrally with the fluid porous structure.

12. The process of claim 10, wherein the longitudinal axes are parallel to each other and perpendicular to a direction of movement of the second conveyor belt.

13. The process of claim 10, wherein adjacent protrusions from the plurality of protrusions are spaced from each other by a distance in the direction of travel such that the food items contact at least two protrusions.

14. An endless flying system comprising:
    a reservoir for holding cooking fluid; and,
    a conveyor system configured to move food items through the bath in a direction of travel while the food items are cooked in the cooking fluid, the conveyor system comprising:
    a first conveyor belt, the first conveyor belt forming a loop; and,
    a second conveyor belt positioned to retain the food items on the second conveyor belt as the food items are moved through the bath, the second conveyor belt comprising a fluid porous structure and a plurality of protrusions extending away from the fluid porous structure towards the first conveyor belt, the second conveyor belt forming a loop and wherein longitudinal axes of each protrusion from the plurality of protrusions extend perpendicular to the direction of travel, wherein the fluid porous structure comprises a plurality of links.

15. The endless flying system of claim 14, wherein each link includes a protrusion from the plurality of protrusions integrally formed in the link.

16. The endless flying system of claim 14, wherein the protrusions are formed by a plurality of bars.

17. The endless flying system of claim 16, wherein the bars are at least partially cylindrical and are welded to the fluid porous structure.

18. The endless flying system of claim 16, wherein the bars are parallel.

19. The endless flying system of claim 16, wherein the bars extend across a width of the upper conveyor belt.

20. The endless flying system of claim 14, wherein the protrusions are formed integrally with the fluid porous structure.

21. The endless flying system of claim 14, wherein adjacent protrusions from the plurality of protrusions are spaced from each other by a distance in the direction of travel such that the food items contact at least two protrusions.

* * * * *